United States Patent [19]

Ito et al.

[11] Patent Number: 5,467,346

[45] Date of Patent: Nov. 14, 1995

[54] PACKET COMMUNICATION METHOD AND PACKET COMMUNICATION APPARATUS

[75] Inventors: Yutaka Ito, Yokohama; Makoto Mori, Hiratsuka; Shinobu Gohara, Yokohama, all of Japan

[73] Assignee: Hitachi, Ltd., Tokyo, Japan

[21] Appl. No.: 266,636

[22] Filed: Jun. 28, 1994

Related U.S. Application Data

[63] Continuation of Ser. No. 789,001, Nov. 7, 1991, Pat. No. 5,386,415.

[30] Foreign Application Priority Data

Nov. 9, 1990 [JP] Japan .................................. 2-302371

[51] Int. Cl.$^6$ .................................................. H04Q 11/04
[52] U.S. Cl. ............................................ 370/60; 370/94.1
[58] Field of Search ............................... 370/54, 60, 60.1, 370/61, 85.1, 85.4, 85.5, 85.9, 85.12, 85.15, 94.1, 94.2, 99, 79, 82, 83; 340/825.05

[56] References Cited

U.S. PATENT DOCUMENTS

| | | | |
|---|---|---|---|
| 4,603,416 | 7/1986 | Servel et al. | 370/94.1 |
| 4,703,475 | 10/1987 | Dretzka et al. | 370/60 |
| 4,755,986 | 7/1988 | Hirata | 370/94.1 |
| 4,768,190 | 8/1988 | Giancarlo | 370/85.15 |
| 4,809,267 | 2/1989 | Higuchi et al. | 370/85.15 |
| 4,815,071 | 3/1989 | Shimizu | 370/60 |
| 4,837,761 | 6/1989 | Isono et al. | 370/60 |
| 4,910,731 | 3/1990 | Sakurai et al. | 370/60 |
| 4,930,122 | 5/1990 | Takahashi et al. | 370/85.15 |
| 4,956,839 | 9/1990 | Torii et al. | 370/94.1 |
| 5,099,475 | 3/1992 | Kozaki et al. | 370/60 |
| 5,101,404 | 3/1992 | Kunimoto et al. | 370/60 |
| 5,113,392 | 5/1992 | Takiyasu et al. | 370/94.1 |
| 5,121,384 | 6/1992 | Ozeki et al. | 370/85.15 |
| 5,151,899 | 9/1992 | Thomas et al. | 370/94.1 |
| 5,229,992 | 7/1993 | Jurkevich et al. | 370/94.1 |

OTHER PUBLICATIONS

"Statistical Multiplexing Effects and Traffic Control Parameters in an ATM Network", Noguchi et al., IEICE Trans., vol. J73B, No. 1, pp. 25–33, Jan. 1990.
"A Memory Switch Architecture for ATM Switching Network", Endo et al., IEICE Technical Report, SSE 88–56, pp. 37–42, Jul. 1988.

*Primary Examiner*—Alpus Hsu
*Attorney, Agent, or Firm*—Antonelli, Terry, Stout & Kraus

[57] ABSTRACT

In communication nodes inserted in a ring-shaped or bus-shaped transmission path, a transmitting section writes transmission packets into transmission buffers in a predetermined order and sends out the transmission packets in the predetermined order onto the transmission path at appropriate unoccupied time of the transmission path, whereas a receiving section temporarily stores packets directed to its own node into a receiving buffer and reads out the packets in the same order as that of writing them into the transmission buffers in the transmitting section.

5 Claims, 7 Drawing Sheets

FIG. 5
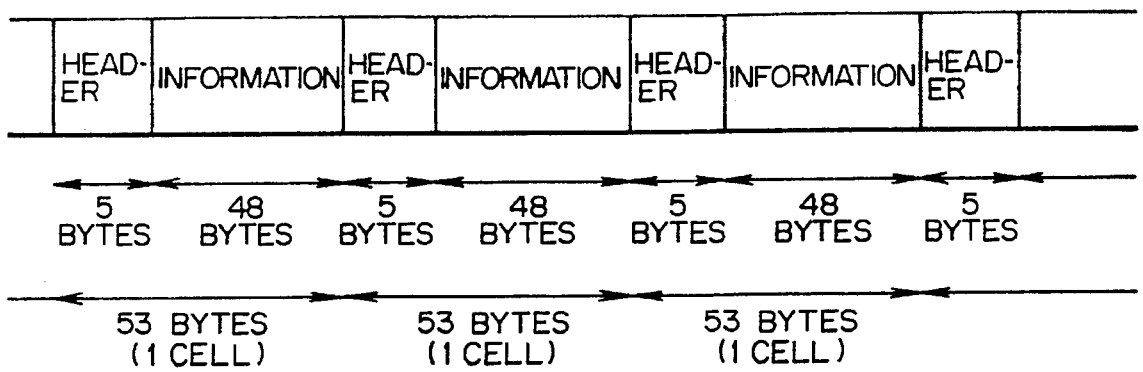
FIG. 6
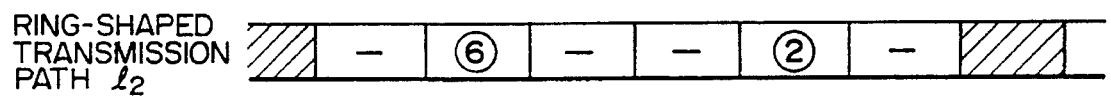
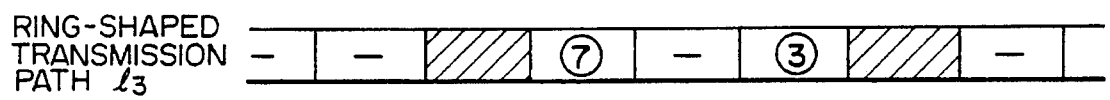
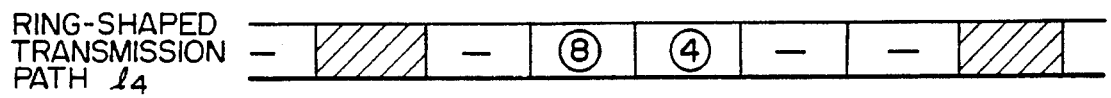

FIG. 7

| | TRANSMISSION PATH TO BE READ SUBSEQUENTLY | RESTART CELL ARRIVING TRANSMISSION PATH | | | | TIME |
| --- | --- | --- | --- | --- | --- | --- |
| | | TRANSMISSION PATH $l_1$ | TRANSMISSION PATH $l_2$ | TRANSMISSION PATH $l_3$ | TRANSMISSION PATH $l_4$ | |
| NODE 1 OF TRANSMISSION SOURCE | 2 | — | — | — | — | |
| NODE 2 OF TRANSMISSION SOURCE | 1 | ○ | — | ○ | — | |

FIG. 8

| | TRANSMISSION PATH TO BE READ SUBSEQUENTLY | THE NUMBER OF PACKETS STORED IN COMMON BUFFER | | | | RESTART CELL ARRIVING TRANSMISSION PATH | | | | TIME |
| --- | --- | --- | --- | --- | --- | --- | --- | --- | --- | --- |
| | | TRANSMISSION PATH $l_1$ | TRANSMISSION PATH $l_2$ | TRANSMISSION PATH $l_3$ | TRANSMISSION PATH $l_4$ | TRANSMISSION PATH $l_1$ | TRANSMISSION PATH $l_2$ | TRANSMISSION PATH $l_3$ | TRANSMISSION PATH $l_4$ | |
| NODE 1 OF TRANSMISSION SOURCE | 2 | 0 | 0 | 2 | — | — | — | — | — | |
| NODE 2 OF TRANSMISSION SOURCE | 3 | 1 | 0 | 0 | — | — | ○ | — | — | |

PACKET COMMUNICATION METHOD AND PACKET COMMUNICATION APPARATUS

This is a continuation of application Ser. No. 07/789,001, filed Nov. 7, 1991, U.S. Pat. No. 5,386,415.

BACKGROUND OF THE INVENTION

The present invention relates to a packet communication system in which voice information, picture information, high-speed data information or the like is communicated in the form of packets, and in particular to a transmission method and apparatus for transmitting the above described information. Especially the present invention relates to a packet communication method and apparatus suitable for packet transmission in which the above described information or the like is transmitted as packets in an asynchronous transfer mode (ATM).

In the field of communication, the ATM method recently attracts attention as a transmission technique capable of handling traffics ranging from a low speed to a high speed in a one-dimensional manner. In the ATM method, various kinds of information is converted into a packet form and transmitted in an asynchronous transfer mode as described above. All information transmitted from a user inclusive of signals is divided into short, fixed-length packets referred to as cells. Fixed-length cells are suitable for higher speed and parallel processing. Each cell includes a header portion having a capacity of several bytes and an information portion having a capacity of several tens to several hundreds bytes which will be described later. The header portion has therein a logical channel number for identifying the destination of transmission (transmission destination communication node: packet communication apparatus) or the call (transmission source subscriber terminal) and an error check code for detecting a header error, for example.

In such an ATM method, all information is handled with fixed-length cells in a unified manner and an arbitrary speed including a variable speed can be coped with. Therefore, the ATM method can cope flexibly with uncertain diverse demand and cope with communication of various media ranging from a low-speed medium to a high-speed medium. That is to say, the ATM method also has a possibility of a multi-media integrated network.

Further, an apparatus in which cells are transmitted does not have slots fixed to respective calls. Therefore, cells can be transmitted to arbitrary positions, resulting in efficient multiplexing.

This multiplexing effect is exhibited in a paper written by Noguchi etc. ("A method for prescribing the statistical multiplexing effect and burst traffic in ATM switching network", IEICE Trans., Vol. J73B, No. 1, PP. 25–33, Jan. 1990). FIG. 3 (P. 27) of this paper shows characteristic curves of the maximum multiplexing factor Nmax capable of satisfying the quality standards condition of the peak value (maximum value) of the information generation speed with respect to the transmission path capacity ratio Rm. It is indicated that a large multiplexing effect is obtained in a region where the maximum speed per call (peak value of information generation speed) is smaller than the transmission path capacity.

If the maximum speed per call approaches the transmission path capacity, i.e., in a region where the maximum speed is larger than the transmission path capacity, however, the multiplexing effect is lowered, resulting in a problem.

In the prior art, no attention is not paid to this point.

SUMMARY OF THE INVENTION

In view of the above described point, the present invention has been made. An object of the present invention is to provide a packet communication method and apparatus capable of having an increased multiplexing effect of transmission path with respect to the maximum speed of calls.

Another object of the present invention is to provide a packet communication method and apparatus which can be applied to a packet communication system having a plurality of communication nodes disposed in a ring-shaped or bus-shaped transmission path, which has a significant multiplexing effect, and which can reduce transmission delay.

Still another object of the present invention is to provide a packet communication method and apparatus which reduces the quantity of hardware and which can be applied to a large-scale communication system.

In accordance with the present invention, the above described objects are achieved by coupling a transmitting section and a receiving section together via a transmission path including a plurality of physical lines and logical lines or a plurality of physical lines or logical lines, sending out transmission packets (cells), which are fed from a user, in a predetermined order from the transmitting section onto the above described transmission path, receiving and temporarily holding the above described packets in the receiving section, and taking out the above described received packets in the same order as the order of their transmission from the transmission section.

Further, in accordance with the present invention, the above described objects are achieved, in a communication system having a plurality of communication nodes inserted in a ring-shaped or bus-shaped transmission path to communicate transmission packets fed from the user between communication nodes, by providing a transmitting section and a receiving section in each of the above described communication nodes, coupling the above described transmitting section and the above described receiving section via a transmission path including a plurality of physical lines and logical lines or a plurality of physical lines or logical lines, writing in the above described transmitting section transmission packets into transmitting buffers in appropriate order, sending out the above described transmission packets thus written onto the above described transmission path at its appropriate unoccupied time, writing (storing) in the receiving section packets directed to its own node temporarily into a receiving buffer, and reading out the packets thus written in the same order as the order of writing them into the above described transmitting buffers in the above described transmitting section.

Further, in accordance with the present invention, the above described transmitting section has an additional configuration for inserting restart cells in every transmission path or writing restart cells into the transmitting buffers at intervals of a predetermined period, whereas the above described receiving section has such an additional configuration that, when the above described restart cell is present in any of the transmission paths, the readout of transmission cells arriving at that transmission path is temporarily stopped and readout from transmission paths is reopened in a predetermined readout order after restart cells have arrived at all of the transmission paths.

Further, in accordance with the present invention, the apparatus is so configured as to use a memory of common buffer type as the above described receiving buffer, form an address chain every transmitting section and every receiving transmission path, store received packets into the above described memory of common buffer type, and perform management of the received packets every transmitting section and every receiving transmission path.

Further, in accordance with the present invention, the above described transmitting section is so configured as to include a plurality of transmitting buffers for writing transmission packets therein and a plurality of write control circuits for controlling the transmitting buffers, and the above described receiving section is so configured as to include a plurality of receiving buffers, read control circuits for controlling the receiving buffers, and ATM switch means for distributing packets arriving from a plurality of transmission paths to the above described plurality of control circuits.

In the packet communication method according to the present invention, the transmission/reception operation is performed in the transmitting section and the receiving section in the same order and hence the order of packets is not disturbed. By using a plurality of transmission paths, therefore, one transmission path equivalently having a large capacity can be realized.

Even if the order of packets arriving at the receiving section is interchanged due to variation of delay in the transmitting buffer or on the transmission path, a wrong order is prevented by keeping early arriving packets waiting in the receiving buffer because packets are read in the same order.

Further, in order to prevent the order of packets becoming continuously wrong in case a packet on a certain transmission path has been missed because of an error on the transmission path or the like, the order is periodically checked by using "restart" cells which are special cells. If the order should be wrong, the order readjustment is performed.

Further, received packets are managed every transmitting section by forming the receiving buffer in the receiving section as a memory of common buffer type. It is thus avoided that a packet fed from another node of transmission source cannot be read out in case a packet fed from a certain node of transmission source cannot be read out. As a result, reduction of the quantity of buffers and reduction of transmission delay time become possible.

Further, separate write and read control using a plurality of write control circuits in the transmitting section and a plurality of receiving buffers in the receiving section facilitates coping with expansion of the apparatus scale.

BRIEF DESCRIPTION OF THE DRAWING

FIGS. 5 and 6 are diagrams illustrating the operation of FIG. 2;

FIG. 7 is a diagram showing storage contents of a state management memory shown in FIG. 3;

FIG. 8 is a diagram showing storage contents of a state management memory shown in FIG. 4.

DESCRIPTION OF THE PREFERRED EMBODIMENTS

Embodiments of the present invention will hereafter be described by referring to FIGS. 1 to 9.

Figure 1:
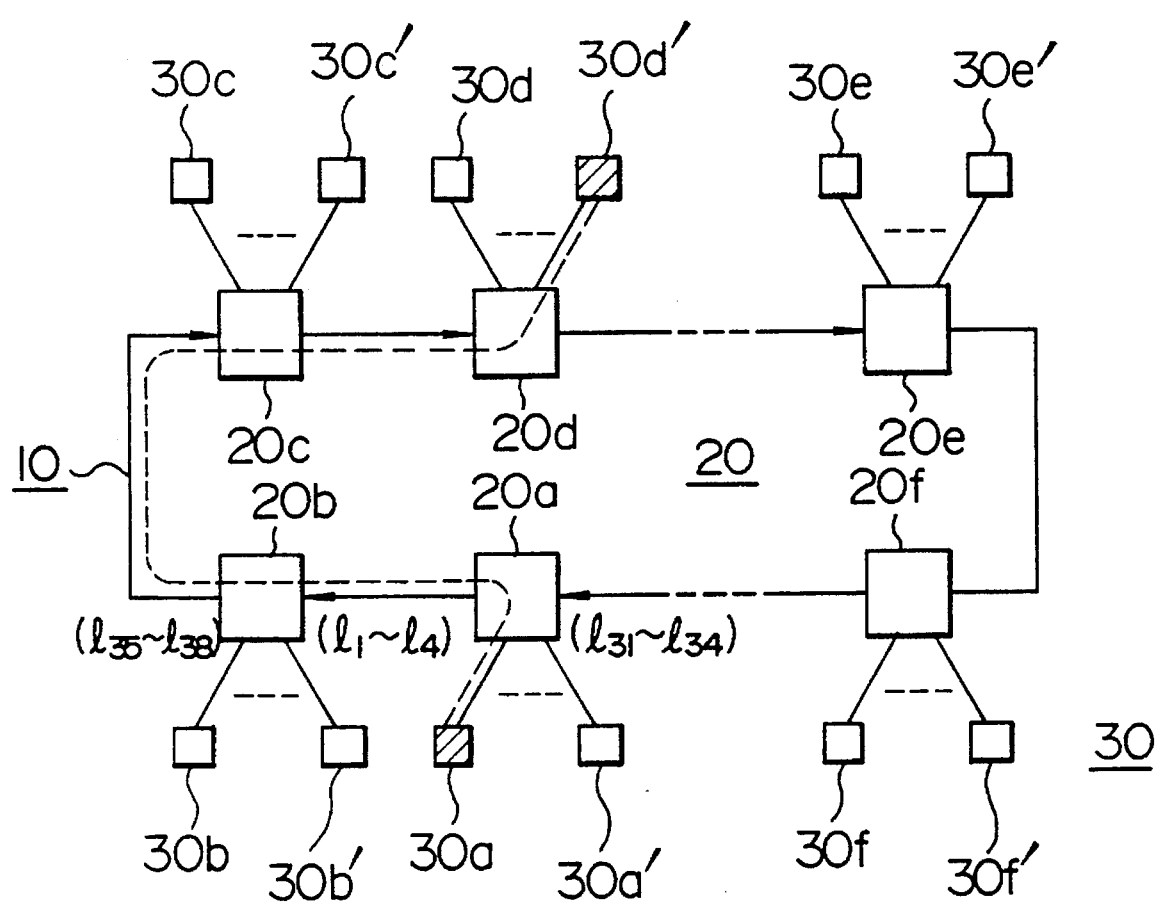
FIG. 1 is a diagram illustrating the application of the present invention.

FIG. 1 is a diagram illustrating an embodiment of the present invention. FIG. 1 is a block diagram showing a packet communication system. A plurality of communication nodes 20 (20a–20f) are inserted in a ring-shaped or bus shaped transmission path 10. A plurality of subscriber terminals (such as telephone, facsimile, videotex, video conference, video telephone, and video terminals) 30 (30a, 30a'–30f, 30f') are connected to each communication node 20. Communication is performed between subscriber terminals via communication nodes and the common transmission path. A route indicated by a broken line in FIG. 1 represents the route of communication between the subscriber terminal 30a and the subscriber terminal 30d'. In this case, the subscriber terminal 30a is functioning as the transmitting side and the subscriber terminal 30d' is functioning as the receiving side.

Figure 2:
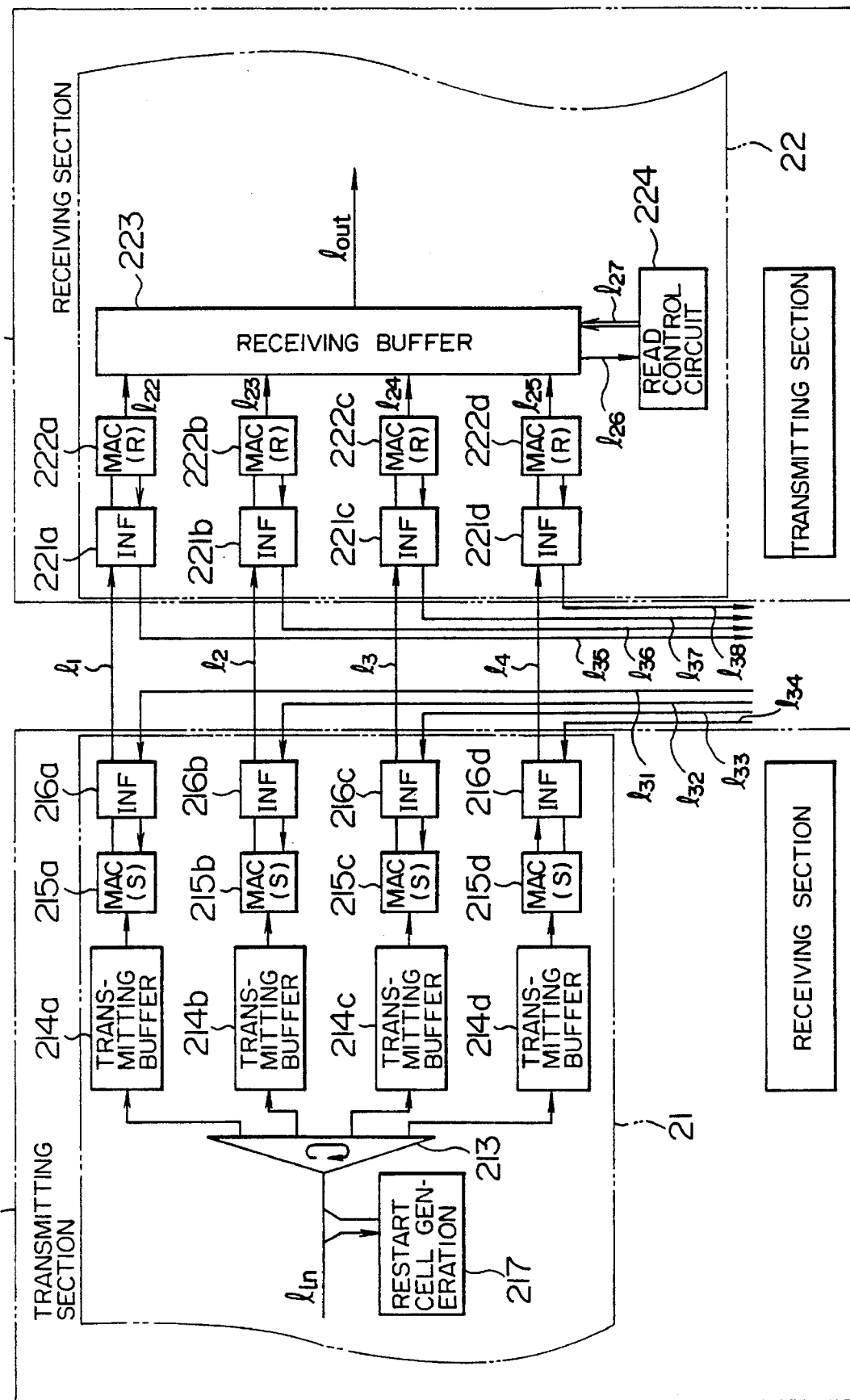
FIG. 2 is a block diagram showing an embodiment of the present invention.

FIG. 2 shows an embodiment in which a packet communication method according to the present invention has been applied to the communication nodes 20 of FIG. 1. FIG. 2 is a block diagram showing an example of a part (20a, 20b) of the communication nodes 20. In FIG. 2, each of the communication nodes 20 (20a, 20b) has a transmitting section 21 and a receiving section 22. The transmitting section 21 and the receiving section 22 of the communication node 20a and the transmitting section 21 and the receiving section 22 of the communication node 20b are coupled by a plurality of transmission paths 10 (four transmission paths are illustrated), i.e., transmission paths including a plurality of physical and logical lines or a plurality of physical lines or logical lines 1.

By taking the case where the communication node 20a is a communication node of the transmitting side and the communication node 20b is a communication node of the receiving side, a packet communication method according to the present invention will hereafter be described by referring to FIG. 2. The transmitting section 21 of the communication node 20a includes a write control circuit 213 for distributing in parallel packets coming in serial from an input transmission path line and restart cells fed from a restart cell generation circuit described later among a plurality of transmission paths in predetermined order every communication node of transmission destination, transmitting buffers 214 (214a–214d) for writing the above described packets therein and keeping them waiting therein, transmitting control circuits 215 (215a–215d) for determining transmission of transmission packets stored in the transmitting buffers 214 (214a–214d) onto transmission paths $1_1$–$1_4$ (transmitting side) on the basis of packet states of the above described transmitting buffers and incoming transmission paths $1_{31}$–$1_{34}$ (receiving side), a restart cell generation circuit 217 for generating restart cells at intervals of a fixed period and for transmitting the restart cells to the plurality of transmission paths $1_1$–$1_4$ via the above described transmitting buffers, and first interface circuits 216 (216a–216d) for physically interfacing with the ring-shaped transmission paths $1_{31}$–$1_{34}$ and the transmission paths $1_1$–$1_4$.

The receiving section 22 of the communication node 20b includes second interface circuits 221 (221a–221d) for physically interfacing with the transmission paths $1_1$–$1_4$ (receiving side) and ring-shaped outgoing transmission paths $1_{35}$–$1_{38}$ (transmitting side), receiving control circuits 222 (222a–222d) for determining whether a packet transmitted from the transmission path $1_1$–$1_4$ is a received packet directed to its own node, i.e., whether a communication packet fed from the communication node 20a is directed to the communication node 20b, a receiving buffer 223 for temporarily storing received packets directed to its own node, and a read control circuit 224 for so exercising control over operation of reading out the received packets from the above described receiving buffer 223 as to ensure the order of transmission. Each of the above described transmitting control circuit 215 and receiving control circuit 222 can be formed by a media access controller (MAC), for example.

Operation of FIG. 2 will hereafter be described.

Packets (cells) supplied from subscriber terminals 30 (30a, 30a') to the input transmission path line are written into the transmitting buffers 214a–214d packet by packet in predetermined order by the write control circuit 213 of the transmitting section 21 of the communication node 20a. This control is exercised by managing the order every node of transmission destination (communication node). The restart cell generation circuit 217 manages the number of transmission packets for each node of transmission destination (communication node), for example. When a predetermined number of packets have been transmitted, the restart cell generation circuit 217 periodically generates restart cells for that node of transmission destination with respect to each of transmitting and receiving lines $1_1$–$1_4$ of the transmission path. The restart cells thus generated are written into the transmitting buffers 214a–214d by the write control circuit 213.

The transmitting control circuits 215a–215d monitor incoming lines $1_{31}$–$1_{34}$ of the ring-shaped transmission path. If a transmission packet is already stored in the transmitting buffer 214a–214d when an unoccupied packet arrives at that transmission path, it is sent out to the line $1_1$–$1_4$ of the transmission path via the first interface circuit 216a–216d.

In case a media access controller (MAC) is used as the transmitting control circuit, however, the controller exercises fairness control or the like in some cases so that respective communication nodes may use the ring-shaped transmission path fairly and the controller does not perform transmission until a favorable time comes, even if an unoccupied packet has arrived.

In the receiving section 22 of the communication node 20b, packets supplied from the lines $1_1$–$1_4$ of the transmission path via the second interface circuits 221a–221d are monitored by the receiving control circuits 222a–222d. If a packet is directed to its own node, that packet is temporarily stored in the receiving buffer 223. Received packets stored in the receiving buffer 223 are read out by the read control circuit 224 in the same order as that of writing them into the transmitting buffers 214a–214d in the transmitting section 21. At this time, packets supplied from transmitting sections of communication nodes (20c, 20d . . . ) other than the transmitting section 21 of the communication node 20a also arrive at the receiving section 22. Therefore, read control is performed by managing the order of readout every node of transmission source (communication node).

Operation of the present embodiment will be described in more detail by referring to FIGS. 5 and 6.

FIG. 5 is a diagram showing the configuration of a packet (cell) used in the present embodiment. As shown in FIG. 5, a packet (cell) includes a header and an information field and has a fixed length (53 bytes). Into the header, an identifier of the node of transmission destination (communication node) or a call identifier of the transmission source (subscriber terminal) is inserted. By discriminating this identifier, reception of each communication node or the like can be decided.

FIG. 6 shows an example of transmission of transmission packets and restart cells on the lines $1_1$–$1_4$ of the transmission path. In the case shown by this example, transmission packets are first written from the transmitting buffer 214a associated with the line $1_1$, and then transmission packets are written from the transmitting buffer 214b associated with the line $1_2$. In this way, writing is performed in a descending order of transmitting buffer. Numerals ① to ⑧ within packets indicate the order of arrival of packets coming from subscriber terminals of the transmitting side. Further, restart cells are inserted on each of lines $1_1$–$1_4$ every eight cells, for example. As shown in FIG. 6, the order of packets (②, ③, ①, ④, ⑦, ⑧, ⑤, ⑧) sent out from the transmitting section 21 to respective lines $1_1$–$1_4$ does not necessarily coincide with the order of inputting (①, ②, ③, ④, ⑤, ⑥, ⑦, ⑧) because of waiting time for transmission in the transmitting buffers 214a–214d. Therefore, there is a possibility that the order of packets arriving at the receiving section will be interchanged. If received packets are read out from the receiving buffer 223 always in the order of line $1_1$, $1_2$, $1_3$ and $1_4$, however, the order is not interchanged. In case a certain packet cannot be received due to a header error caused by a transmission error or the like, however, packets arriving from that line are read in respectively preceding periods and hence the order continues to be wrong. By periodically inserting restart cells as shown in FIG. 5, therefore, confirmation and readjustment of order can be performed. That is to say, the correct order is restored by reopening the next readout period after restart cells have arrived at respective lines.

Further detailed configuration and operation of the receiving buffer 223 and the read control circuit 224 will now be described by referring two examples of configuration shown in FIGS. 3 and 4.

Figure 3:
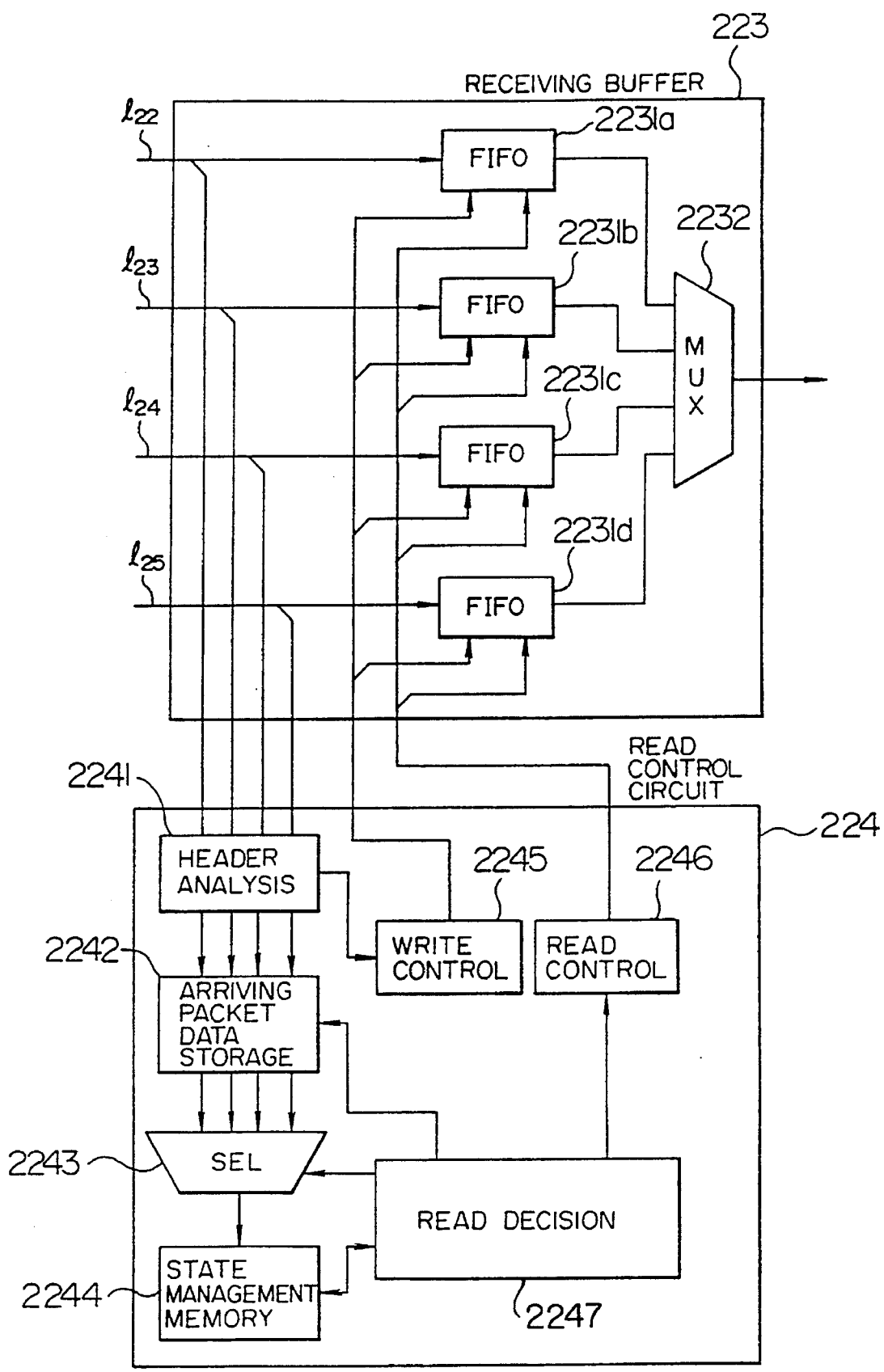
FIG. 3 is a block diagram of a receiving buffer and a read control circuit shown in FIG. 2 in case individual buffers are used.

FIG. 3 shows an example of configuration of the receiving buffer 223 and the read control circuit 224 in case buffers are provided respectively on the lines $1_1$–$1_4$ of the ring-shaped transmission path of the input side.

With reference to FIG. 3, the receiving buffer 223 includes FIFO (first-in first-out) memories 2231a–2231d respectively coupled to output lines $1_{22}$–$1_{25}$ respectively of the receiving control circuits 222a–222d respectively corresponding to the lines $1_1$–$1_4$ of the ring-shaped transmission path. The receiving buffer 223 also includes a multiplexing circuit 2232 for converting parallel cells read out from the FIFO memories 2231a–2231d into serial cells to multiplex them.

The read control circuit 224 includes a header analysis circuit 2241 for analyzing headers of received packets and discriminating the node of transmission source (communication node) and restart cells, an arriving packet data storage circuit 2242 for storing information supplied from the header analysis circuit 2241 in the order of arriving packets, a selector 2243 for switching data supplied from the arriving packet data storage circuit 2242, a state management memory 2244 for storing packet arrival states for every node of transmission source, a read decision circuit 2247 for exercising read decision control over packets written into the FIFO's 2231a–2231d on the basis of information supplied from the state management memory 2244, a memory write control circuit 2245 for exercising write control over the FIFO memories 2231a–2231d, and a memory read control circuit 2246 for exercising control over reading packets from the FIFO memories 2231a–2231d.

Operation of the receiving buffer 223 and the read control circuit 224 shown in FIG. 3 will hereafter be described.

Received packets supplied from the receiving control circuits 222a–222d are written into corresponding FIFO memories 2231a–2231d. However, restart cells are not written but they are discarded here. Header portions of received packets are simultaneously transmitted to the header analysis circuit 2241 to discriminate the nodes of transmission source and restart cells. Results are successively stored into the arriving packet data storage circuit 2242 for each of lines $1_1$–$1_4$. Those data are successively sent to the state management memory 2244 by the selector 2243. Packet arrival states stored for every node of transmission source are sent to the read decision circuit 2247 to determine whether packets can be read out.

FIG. 7 shows contents of data stored in the state management memory 2244. As data, the transmission path number to be read subsequently, the arrival situation of restart cells, and the arrival time (time) of the packet which has arrived lastly are stored for each node of transmission source. As for the node 1 of transmission source, the example of FIG. 7 indicates that a packet which has arrived at the second line $1_2$ should be read out subsequently. It is also indicated that restart cells have not arrived in the current period. As for the node 2 of transmission source, it is indicated that a packet is to be read out from the first line $1_1$. Since a restart cell has already arrived at the first line $1_1$, however, its readout is started after arrival of restart cells at respective lines $1_1$–$1_4$. The arrival time of the packet which has arrived lastly (time) serves as a timer for coping with the loss of a restart cell caused by a transmission error or the like or mutual block of readout performed each other by cells of different transmission sources. If readout operation has stopped for at least a certain predetermined period, read skip is performed.

The decision and processing heretofore described are executed by the read decision circuit 2247. In case a packet has been read out from the FIFO memory 2231a–2231d, data associated with the packet thus read out and stored in the arriving packet data storage circuit 2242 is erased and the line value of the transmission path to be read out subsequently stored in the state management memory 2244 is updated.

Figure 4:
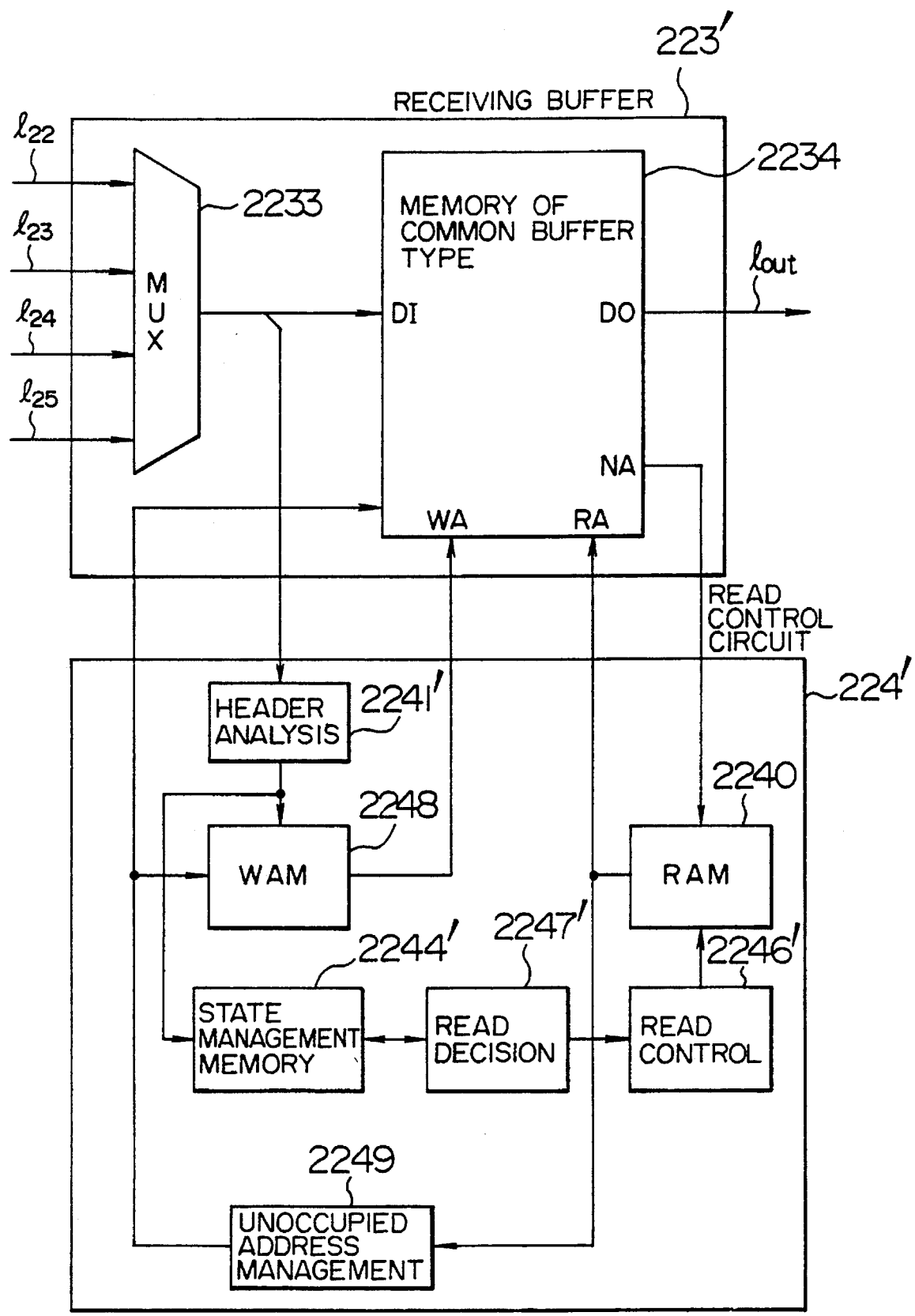
FIG. 4 is a block diagram of the receiving buffer and the read control circuit shown in FIG. 2 in case a memory of common buffer type is used.

FIG. 4 shows an example of configuration of a receiving buffer 223' and a read control circuit 224' in case a memory of common buffer type is used as the receiving buffer.

With reference to FIG. 4, the receiving buffer 223' includes a multiplexing circuit 2233 for converting packets received in parallel from the receiving control circuits 222a–222d of FIG. 2 into a serial form to perform multiplexing and a memory 2234 of common buffer type for forming chains of received packets for every node of transmission source (communication node) and for every line of the input transmission path and for storing the chains.

As this memory of common buffer type, a memory as described in "A proposal of ATM switching architecture", Endo etc., *IEICE Technical Report*, SSE 88–56, (July 1988) can be used.

The read control circuit 224' includes a header analysis circuit 2241' for analyzing the header of a received packet and discriminating the node of transmission side (communication node) and the restart cell, a write address memory 2248 for storing write addresses, which are used to write the next received packet into the memory 2234 of common buffer type when it arrives, for every node of transmission source (communication node) and for every input transmission path, a state management memory 2244' for managing packet arrival states for every node of transmission source, a read decision circuit 2247' for making a decision on reading a packet from the memory 2234 of common buffer type on the basis of information supplied from the state management memory 2244', a memory read control circuit 2246' for exercising read control over packets in the order of transmission on the basis of information supplied from the read decision circuit 2247', a memory read control circuit 2246' for exercising read control over packets in the order of transmission on the basis of information supplied from the read decision circuit 2247', a read address memory 2240 for storing addresses of packets to be read subsequently for every node of transmission source and for every receiving transmission path, and an unoccupied address management memory 2249 for storing unoccupied addresses of the memory 2234 of common buffer type.

Operation of the receiving buffer 223' and the read control circuit 224' shown in FIG. 4 will hereafter be described.

Received packets supplied from the receiving control circuits 222a–222d shown in FIG. 2 are subjected to parallel-to-serial conversion in the multiplexing circuit 2233. The received packets thus multiplexed are written into the memory 2234 of common buffer type. However, restart cells are not written but they are discarded here. Header portions of received packets are simultaneously transmitted to the header analysis circuit 2241' to discriminate the nodes of transmission source and restart cells in the circuit. Results are stored in the state management memory 2244'. When the above described received packet is written into the memory 2234 of common buffer type, an address to be written subsequently is outputted from the unoccupied address management memory 2249, and the address to be written subsequently is written into the same address in the memory 2234 of common buffer type as that of the received packet. As for the write address memory 2248 as well, an address to be written subsequently is stored and the next packet is written into the location of that address. A received packet and the address of the next packet are stored together in the memory 2234 of common buffer type. When a received packet is read out, therefore, an address to be read subsequently is outputted. The address to be read subsequently is stored in the read address memory 2240, and the next packet is read out in accordance with that address. The address whose packet has been read out is returned to the unoccupied address management memory 2249.

That is to say, in the above described common buffer memory 2234, received packets form an address chain for every node of transmission source and for every input transmission path and each chain functions in the same way as a FIFO (first-in first-out) memory.

Upon arrival of a received packet, the read decision circuit 2247' takes in data concerning the node of transmission source of the received packet from the state management memory 2244' and determines whether readout can be performed. If readout is possible, the read decision circuit 2247' informs the read control section 2246' of nodes of transmission source and input transmission paths of readable packets in the order of readout.

FIG. 8 shows storage contents of the state management memory 2244'. For every node of transmission source, there are stored the number of a transmission path (line) to be read subsequently, the number of packets so stored in the common buffer as to correspond to each of lines $1_1$–$1_4$ of the transmission path, the situation of arrival of restart cells on each of lines $1_1$–$1_4$ of the transmission path in the current period, and the arrival time (time) of a packet which has arrived lastly. As for the node 1 of transmission source, the example of FIG. 8 indicates that a packet which has arrived at the second transmission path (line $1_2$) should be read out subsequently. It is also indicated that restart cells have not arrived in the current period. If in this state a packet arrives at the second transmission path (line $1_2$), that packet can be read. In addition, packets have already arrived at the third transmission path (line $1_3$) and the fourth transmission path (line $1_4$) as well. Therefore, these packets can be successively read out in the wake of the above described packet which arrived at the second transmission path.

As for the node 2 of transmission source, it is indicated that a packet which has arrived at the third transmission path (line $1_3$) should be read out subsequently. A restart cell has already arrived at the first transmission path (line $1_1$). If in this state a packet arrives at the third transmission path (line $1_3$), that packet can be read. In addition, a packet has already arrived at the fourth transmission path (line $1_4$) as well. Therefore, that packet can also be read out in succession. As for the packet which has already arrived at the first transmission path (line $1_1$), however, the restart cell already arrived at that transmission path (line $1_1$) and hence it can be read out after restart cells arrive at respective lines $1_1$–$1_4$ of the transmission path. The arrival time of the packet which has arrived lastly (time) serves as a timer for coping with the loss of a restart cell or the like caused by a transmission error or the like. If readout operation has stopped for at least a certain predetermined period, readout is reopened from the next packet or a packet in the beginning of the next period.

The decision and processing heretofore described are executed by the read decision circuit 2247'. Readable packet information contents (node number of transmission source and transmission path number) are sent to the read control circuit 2246' in the order of readout. On the basis of the above described readable packet information, the read control circuit 2246' sends out the node number of transmission source and the transmission path number to the read address memory 2240 every packet period. Thereby the next read address is outputted from the read address memory 2240 and received packets are successively read out from the memory 2234 of common buffer type.

An embodiment in which the present invention is applied to an apparatus having a larger scale will now be described by referring to FIG. 9.

Figure 9:
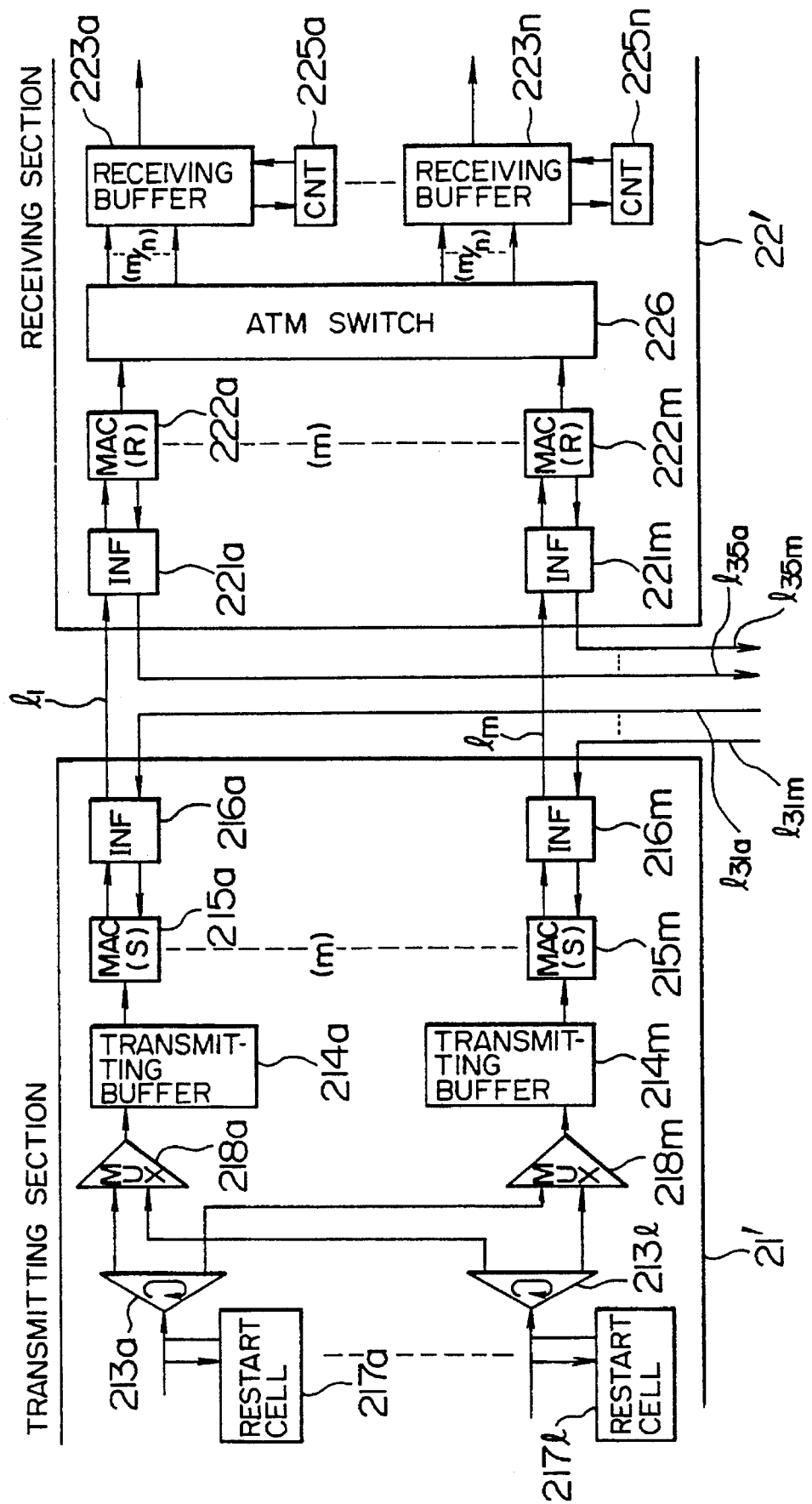
FIG. 9 is a block diagram of an embodiment in which the present invention is applied to a large-scale system.

FIG. 9 shows an example of configuration in case the scale of the embodiment of FIG. 2 is expanded to use m ring-shaped transmission paths. A transmitting section 21' includes restart cell generation circuits 217a–2171, write control circuits 213a–2131, transmission packet multiplexing circuits 218a–218m, transmitting buffers 214a–214m, transmitting control circuits 215a–215m, and first interface circuits 216a–216m. A receiving section 22' includes second interface circuits 221a–221m, receiving control circuits 222a–222m, an ATM packet switch 226 for distributing received packets by taking a certain predetermined number (m/n) of communication nodes of transmission source as the unit, receiving buffers 223a–223n, and read control circuits 225a–225n associated with the receiving buffers.

In the configuration of the present embodiment, a large number (m) of ring-shaped transmission paths $1_{31a}$–$1_{31m}$, $1_1$–$1_m$, and $1_{35a}$–$1_{35m}$ are used. If the same configuration as FIG. 2 is used, therefore, there is a possibility that the control operation for writing transmission packets into the transmitting buffers 214a–214m in the transmitting section 21' and the control operation for reading received packets from the receiving buffers in the receiving section 22' will become difficult as regards the processing speed. In the present embodiment, therefore, the write control in the transmitting section 21' and the read operation in the receiving section 22' are performed separately to cope with the problem of processing speed. In the example of FIG. 9, the write control in the transmitting section 21' is exercised by 1 write control circuits 213a–2131 and 1 restart cell generation circuits 217a–2171 associated with the write control circuits, whereas the read-control in the receiving section 22' is exercised by n receiving buffers 223a–223n and n read control circuits 225a–225n associated with the receiving buffers. In order to perform the write control separately in the transmitting section 21' transmission packet multiplexing circuits for multiplexing packets supplied from the write control circuits 213a–2131 are so provided as to be associated with the transmitting buffers 214a–214m, respectively. Further, in order to perform the read control separately in the receiving section 22', the ATM packet switch 226 for distributing received packets among the receiving buffers 223a–223n in accordance with the node of transmission source is inserted between the receiving control circuits 222a–222m and the receiving buffers 223a–223n.

In the present configuration, the write control and the restart cell generation in the transmitting section 21' are performed separately. Therefore, the read control in the receiving section 22' is so performed as to correspond to the write control circuits 213a–2131 included in the transmitting section.

By using the configuration of FIG. 9 described above, expansion to a larger-scale system becomes possible.

Embodiments in which the present invention is applied to ring-shaped transmission paths have heretofore been described. However, the present invention can be further applied to one-to-one communication or communication using a configuration having a plurality of nodes disposed in a bus-shaped transmission path. Further, in the embodiments described above, a plurality of physical transmission paths have been used. However, the number of transmission paths may be reduced by using frequency division multiplex or wavelength multiplex to perform logical multiplexing on a transmission path.

In the embodiments described above, it becomes possible to equivalently form one transmission path having a large capacity by using a plurality of transmission paths, resulting in an enhanced multiplexing effect. Further, if a common buffer memory is used as the receiving buffers in the receiving section, the quantity of memories can be reduced by common use of the memory and the packet transmission delay can be reduced because mutual blocking between packets supplied from different nodes of transmission source can be avoided owing to management of received packets for every node of transmission source. Further, if separate write control and separate read control are exercised respectively in the transmitting section and the receiving section as described before, a large-scale system can be realized.

By using a plurality of physical and logical lines or plurality of physical or logical lines in accordance with the present invention, a single line having a large capacity (the sum total of a plurality of physical and logical lines or a plurality of physical or logical line capacities) can be equivalently formed and hence the multiplexing effect can be enhanced.

In the embodiments described above, control of transmission of packets to a transmission path and control of reception of packets from a transmission path are independent of a mechanism for exercising control over a plurality of lines such as control of writing packets into a transmitting buffer in the transmitting section and read control in the receiving section. Therefore, independent operation is possible without being conscious of other transmission paths. Its operation and configuration can be made similar to those of a single line.

Further, if a memory of common buffer type is used as the receiving buffers in the receiving section, the quantity of buffers and the packet transmission delay can be reduced.

Further, by separate write control in the transmitting section and separate read control in the receiving section, a large-scale system can be realized.

We claim:

1. A packet communication system for communicating packets each having a fixed length and including a header portion and an information portion between nodes through a plurality of transmission paths, said plurality of transmission paths for connecting said nodes comprise plural low speed and low capacity physical or logical lines, each node comprising:

a packet transmitting section which comprises:

means for distributing packet trains to be sent to a receiving section of another node into said plural low speed and low capacity physical or logical lines, wherein packets included in said packet trains are arranged in a predetermined order, and for transmitting said packets on said plural low speed and low capacity physical or logical lines; and a packet receiving section which comprises:

buffer means for storing packets received from said plural low speed and low capacity physical or logical lines corresponding to said plural low speed and low capacity physical or logical lines respectively, and read controlling means for monitoring whether said packets are received or not from said plural low speed and low capacity physical or logical lines, for storing management information concerning packets received, for reading out said packets stored in said buffer means in the same predetermined order as arranged at a packet transmitting section which transmitted said packets based on said management information when said packets have been received, and for waiting until said packets have been received in said buffer means and then reading out said packets based on said management information when said packets have not been received, said packet trains are received and reproduced by said packet receiving section for receiving side communication nodes in the same predetermined order as said packet trains transmitted by said packet transmitting section of transmitting side communication nodes.

2. A packet communication system according to claim 1, wherein said packet transmitting section further comprises:

means for transmitting information corresponding to said predetermined order on said plural low speed and low capacity physical or logical lines to said another packet receiving section; and wherein said packet receiving section further comprises:

means for receiving information corresponding to said predetermined order transmitted by another packet transmitting section and holding said information corresponding to said predetermined order as said management information, and said packet trains are received and reproduced by said packet receiving section after receiving said information corresponding to said predetermined order transmitted by said another packet transmitting section.

3. A packet communication system according to claim 2, wherein said information is periodically transmitted from said another packet transmitting section to said packet receiving section through said plurality of transmission paths, and wherein when said predetermined order at said another packet transmitting section is changed, said packets transmitted by said another packet transmitting section are received and reproduced by said packet receiving section after receiving information corresponding to the changed predetermined order transmitted from said another packet transmitting section.

4. A packet communication system according to claim 1, wherein a common buffer type memory for logically buffering packets received from said plurality of transmission paths is used as a buffer for said packet receiving section, and said packets received from each of said plurality of said transmission paths are stored in said common buffer type memory.

5. A packet communication system for communicating packets each having a fixed length and including a header portion and an information portion between nodes through a plurality of transmission paths, said nodes including means for switching said packets, said plurality of transmission paths for connecting said nodes comprise plural low speed and low capacity physical or logical lines, and said plurality of transmission paths are divided and connected to any plural nodes, each node comprising:

a transmitting section which comprises:

means for distributing packet trains to be sent to a receiving section of another node into said plural low speed and low capacity physical or logical lines, wherein packets included in said packet trains are arranged in a predetermined order, and for transmitting said packet trains on said plural low speed and low capacity physical or logical lines; and a receiving section which comprises:

buffer means for storing packets received from said plural physical low speed and low capacity or logical lines corresponding to said plural low speed and low capacity physical or logical lines respectively, and read controlling means for monitoring whether said packets are received or not from said plural low speed and low capacity physical or logical lines, for storing management information concerning packets received from said plural low speed and low capacity physical or logical lines for reading out said packets stored in said buffer means in the same predetermined order as arranged at a packet transmitting section which transmitted said packets based on said management information when said packets have been received, and for waiting until said packets have been received in said buffer means and then reading said packets based on said management information when said packets have not been received, said packet trains are received and reproduced by said packet receiving section of receiving side communication nodes in the same predetermined order as said packet trains transmitted by said packet transmitting section of transmitting side communication nodes.

* * * * *